(12) United States Patent
Tran et al.

(10) Patent No.: US 9,135,014 B2
(45) Date of Patent: Sep. 15, 2015

(54) DATA PROCESSING SYSTEM WITH LATENCY TOLERANCE EXECUTION

(75) Inventors: Thang M. Tran, Austin, TX (US); Trinh Huy Nguyen, Round Rock, TX (US)

(73) Assignee: FREESCALE SEMICONDUCTOR, INC, Austin, TX (US)

(\*) Notice: Subject to any disclaimer, the term of this patent is extended or adjusted under 35 U.S.C. 154(b) by 797 days.

(21) Appl. No.: 13/397,452

(22) Filed: Feb. 15, 2012

(65) Prior Publication Data
US 2013/0212358 A1    Aug. 15, 2013

(51) Int. Cl.
*G06F 9/38* (2006.01)
*G06F 9/30* (2006.01)

(52) U.S. Cl.
CPC .......... *G06F 9/3855* (2013.01); *G06F 9/30094* (2013.01); *G06F 9/3836* (2013.01); *G06F 9/3838* (2013.01); *G06F 9/3851* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,655,096 | A * | 8/1997 | Branigin | 712/200 |
| 5,699,537 | A | 12/1997 | Sharangpani et al. | |
| 5,805,853 | A * | 9/1998 | White et al. | 712/218 |
| 5,870,580 | A * | 2/1999 | Walker | 712/218 |
| 5,958,043 | A * | 9/1999 | Motomura | 712/216 |
| 5,974,538 | A * | 10/1999 | Wilmot, II | 712/218 |
| 6,931,641 | B1 | 8/2005 | Davis et al. | |
| 7,263,600 | B2 * | 8/2007 | Sander et al. | 712/218 |
| 7,844,799 | B2 * | 11/2010 | Leenstra et al. | 712/216 |
| 2004/0215632 | A1 | 10/2004 | Isip et al. | |
| 2004/0216101 | A1 | 10/2004 | Burky et al. | |

OTHER PUBLICATIONS

Luk, Chi-Keung etal., Memory Forwarding: Enabling Aggressive Layout Optimizations by Guaranteeing the Safety of Data Relocation, 1999, IEEE, 12 pages.*
Bai et al.; "A Dynamically Reconfigurable Mixed In-Order/Out-of-Order Issue Queue for Power Aware Microprocessors"; IEEE Computer Society Annual Symposium Proceedings, VLSI; Feb. 20-21, 2003; pp. 139-146; IEEE.
Raasch et al.; "A Scalable Instruction Queue Design Using Dependence Chains"; Proceedings of the 29th Annual International Symposium on Computer Architecture; 2002; pp. 318-329; IEEE Computer Society.
Smotherman; "Eager Execution/Dual Path/Multiple Path"; http://www.cs.clemson.edu/~mark/eager.html; Jul. 2010; 8 Pgs.; Clemson School of Computing.
U.S. Appl. No. 13/419,531, filed Mar. 14, 2012.
U.S. Appl. No. 13/397,452, filed Feb. 15, 2012.
U.S. Appl. No. 13/036,251, filed Feb. 28, 2011.
U.S. Appl. No. 13/210,566, filed Aug. 16, 2011.
U.S. Appl. No. 13/116,325, filed May 26, 2011.
U.S. Appl. No. 13/212,420, filed Aug. 18, 2011.

\* cited by examiner

*Primary Examiner* — Eric Coleman (57) ABSTRACT

A data processing system comprises a processor unit that includes an instruction decode/issue unit including a re-order buffer having entries that include an execution queue tag that indicates an execution queue location of an instruction to which a re-order buffer entry is assigned, a result valid indicator to indicate that a corresponding instruction has executed with a status bit valid result, and a forward indicator to indicate that the status bit can be forwarded to an execution queue of an instruction pointed to that is waiting to receive the status bit.

17 Claims, 9 Drawing Sheets

| TAGS 304 | TAGS FOR KEEPING TRACK OF INSTRUCTION ORDERING DURING EXECUTION:<br>• CP_TAG: CHECKPOINT TAG FOR ALL INSTRUCTIONS. THE CHECKPOINT TAG IS INCREMENTED ONLY FOR BRANCH AND LOAD INSTRUCTIONS.<br>• CB_TAG: COMPLETION BUFFER TAG IS INCREMENTED ONLY FOR BRANCH, LOAD, STORE, FLOATING-POINT AND ALTIVEC INSTRUCTIONS.<br>• SB_TAG: STORE BUFFER TAG OR BRANCH PREDICTION TAG. (1) FOR STORE OR LOAD INSTRUCTION, THIS TAG IS THE CURRENT WRITE POINTER OF THE STORE BUFFER. THE WRITE POINTER IS INCREMENTED ONLY FOR STORE INSTRUCTION. (2) FOR PREDICTED BRANCH INSTRUCTION, THIS TAG IS THE ENTRY OF THE PREDICTED BRANCH TARGET ADDRESS BUFFER (PB_TAB). AS THE TAKEN BRANCH INSTRUCTION IS PREDICTED THE TARGET ADDRESS IS WRITTEN INTO THE PBTAB, AND THE ENTRY NUMBER IS ATTACHED WITH THE PREDICTED BRANCH INSTRUCTION FROM FETCH UNTIL ENTERING EXECUTION QUEUE. (3) FOR ALU INSTRUCTIONS, IT IS THE ENTRY OF CA RE-ORDER BUFFER.<br>• LB_TAG: LOAD BUFFER TAG OR SYNC TAG. (1) FOR STORE OR LOAD INSTRUCTION, THIS TAG IS THE CURRENT WRITE POINTER OF THE LOAD BUFFER. THE WRITE POINTER IS INCREMENTED ONLY FOR LOAD INSTRUCTION. (2) FOR SYNC ENTRY IN THE EXECUTION QUEUE, THIS SYNC_TAG IS POINTED TO THE ACTUAL INSTRUCTION IN ANOTHER EXECUTION QUEUE WHICH CONSISTS OF THE EXECUTION QUEUE NUMBER AND THE ENTRY NUMBER IN THE QUEUE. (3) FOR ALU INSTRUCTIONS, IT IS THE ENTRY OF THE CR RE-ORDER BUFFER. |
|---|---|
| PEND 302 | INSTRUCTION IS PENDING ON CONDITION EXECUTION:<br>• RESULT_PENDING: INSTRUCTION HAS BEEN SENT TO LOAD/STORE EXECUTION UNIT AND IS WAITING FOR RESULT DATA THAT IS READY IN NEXT CLOCK CYCLE.<br>• CA_PENDING: INSTRUCTION WITH CARRY-IN, WAITING FOR CARRY BIT TO BE FORWARDED FROM OTHER EXECUTION QUEUE.<br>• CR_PENDING: INSTRUCTION WITH CR INPUT, WAITING FOR CR RESULT TO BE FORWARDED FROM OTHER EXECUTION QUEUE. THIS BIT MAY BE COMBINED WITH CA_PENDING UNLESS THERE IS AN INSTRUCTION THAT NEEDS BOTH PENDING BITS.<br>• SYNC_PENDING (2 BITS): INSTRUCTION IS WAITING FOR RESULTS FROM OTHER EXECUTION QUEUES. FOR EXAMPLE, LOAD INSTRUCTION IS WAITING FOR RESULTS FROM SIMPLE EXECUTION QUEUE AND COMPLEX EXECUTION QUEUE.<br>• CA_WRITE: INSTRUCTION WILL WRITE TO CARRY BIT<br>• CR_WRITE: INSTRUCTION WILL WRITE TO CR |

DATA PROCESSING SYSTEM WITH LATENCY TOLERANCE EXECUTION

BACKGROUND

1. Field

This disclosure relates generally to data processing systems, and more specifically, to configuring a data processing system for latency tolerance execution.

2. Related Art

One goal of ongoing processor development is to increase the number of instructions per cycle (IPC). A computer processor's IPC is typically limited by stalling of instructions in queues due to the inability to access memory when instructions are executed in-order. Issuing instructions out-of-order can help to a certain degree, but eventually stalled instructions will block other independent instructions from execution as out-of-order dependent instructions fill up the queue.

Further, there is ever-increasing pressure to reduce power consumption in computer processor devices to conserve available power and extend the operating life of portable devices between re-charging cycles.

BRIEF DESCRIPTION OF THE DRAWINGS

Embodiments of the present disclosure are illustrated by way of example and are not limited by the accompanying figures, in which like references indicate similar elements. Elements in the figures are illustrated for simplicity and clarity and have not necessarily been drawn to scale.

FIG. 4 is a diagram of the TAGS and PEND fields of the execution queue entry of FIG. 3 in accordance with one embodiment of the present disclosure.

DETAILED DESCRIPTION

In one embodiment, a data processing system uses a number of execution queues in which decoded instructions are issued to the queues and the instructions in each execution queue are executed in order but the instructions from different execution queues can execute out-of-order. Furthermore, many of the instructions issued to instruction execution queues may include dependencies on conditions generated by other instructions, such as, for example, carry bits and condition codes. In one embodiment, the data processing system includes re-order buffers for tracking various status bit updates, such as for tracking a carry condition or a condition code condition. These re-order buffers, as will be described in more detail below, may be used to further help coordination of out-of-order execution of instructions. For example, in one embodiment, entries of a re-order buffer may be used to keep track of which instructions within the execution queues generate one or more status bits and which instructions within the execution queues are waiting for those one or more status bits to be valid. In some cases, the re-order buffer may be used to forward one or more status bits to one or more appropriate instructions pending in the execution queues.

Figure 1:
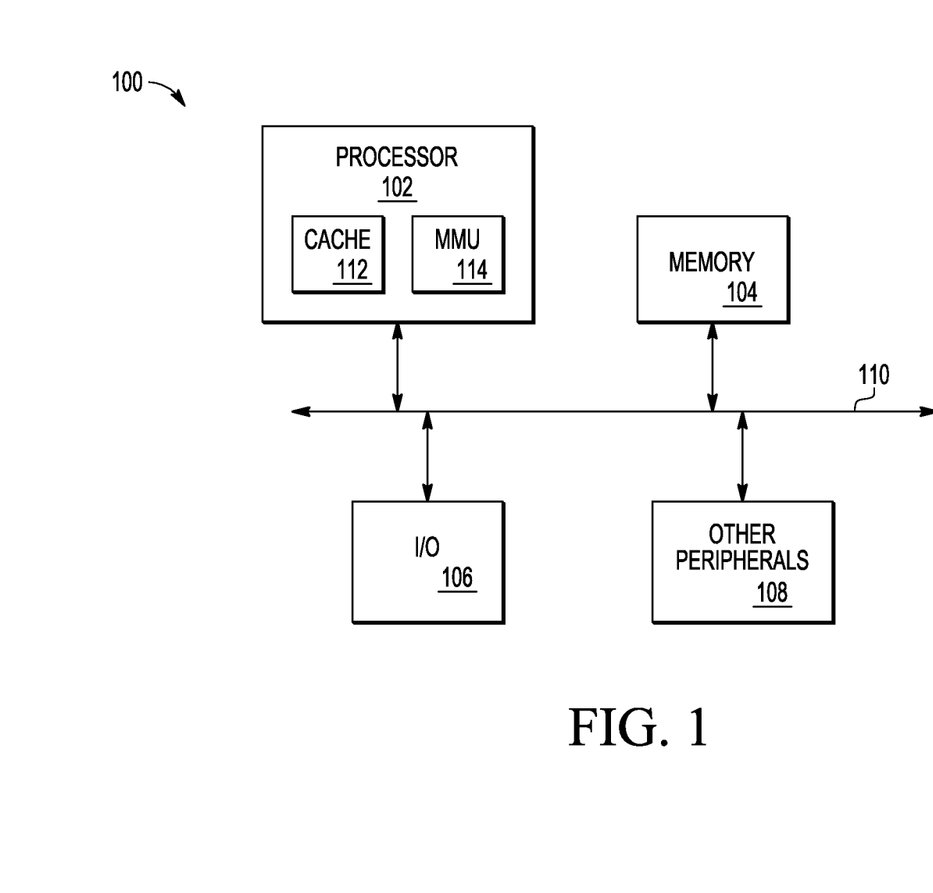
FIG. 1 is a diagram of an embodiment of a data processing system in accordance with one embodiment of the present disclosure.

FIG. 1 shows a data processing system 100 in which instruction decode and issue for latency tolerance execution can be implemented according to some embodiments of the disclosure. System 100 can be a superscalar microprocessor architecture in which instructions are issued in order to execution queues and instructions in each execution queue are executed in order but the instructions from different execution queues can execute out-of-order. At comparable performance points, system 100 has the lower power and area requirements than systems that use only out-of-order execution queues.

In the illustrated embodiment, components in data processing system 100 include processor 102, memory 104, input/output (I/O) handlers/interfaces 106, and other peripheral devices or modules 108 which are bi-directionally coupled to bus 110 to allow communication between components. Processor 102 includes Level 1 cache memory units 112 and memory management unit (MMU) 114.

Bus 110 may communicate external to data processing system 100. Alternate embodiments of the present disclosure may use more, less, or different components and functional blocks that those illustrated in FIG. 1. As some possible examples, alternate embodiments of data processing system 100 may include a timer, a serial peripheral interface, a digital-to-analog converter, an analog-to digital converter, a driver (e.g. a liquid crystal display driver), and/or a plurality of types of memory.

MMU 114 is capable of providing various cache memory and bus control signals as well as virtual address to physical address translation. The virtual address is an address that is generated by processor 102 and as viewed by code that is executed by processor 102. The physical address is used to access the various higher-level memory banks such as a level-one RAM memory. Once processor 102 requests data from memory, MMU 114 can send a task identifier associated to the data request (or more generally to the task that is being executed by processor 102) to memory 104 and also to data cache internal to processor 102.

In alternate embodiments, data processing system 100 may include one, two, or any number of processors 102. If a plurality of processors 102 are used in data processing system 100, any number of them may be the same, or may be different. Note that although data processing system 100 may have a plurality of processors 102, a single processor 102 may itself execute a plurality of instruction sets.

Memory module 104 can include a multi-level cache architecture including one or more levels of instruction cache and data cache module that have slower access rates than Level 1 cache modules 112. Memory 104 can also include an external memory that is also referred to as a main memory and can optionally include additional devices such as buffers and the like.

Figure 2:
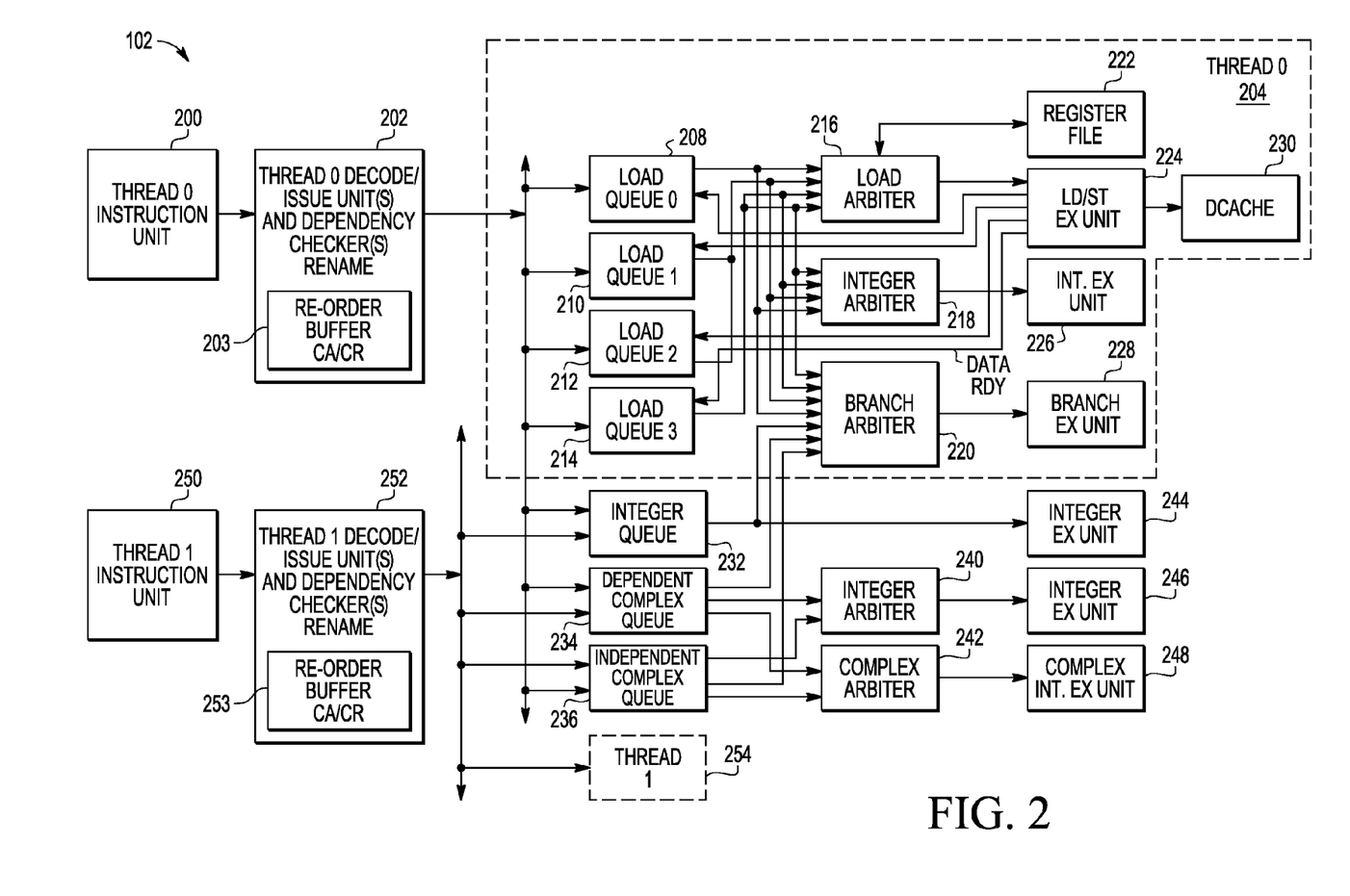
FIG. 2 is a diagram of an embodiment of instruction handling components that can be included in the processor of FIG. 1 in accordance with one embodiment of the present disclosure.

FIG. 2 is a diagram of an embodiment of instruction handling components that can be included in processor 102 of FIG. 1 with latency tolerance execution of one or more program threads (e.g., Thread0 and Thread1). Thread0 and Thread1 instruction units 200, 250 implement instruction queues configured to provide program instructions to respective decode units 202, 252. Decode units 202, 252 can include logic to multiplex valid instructions, decode instructions for instruction type, source, and destination operands, generate queue entries and tags for instructions, rename instruction operands to a latest register mapping, determine source and destination register dependencies between decoded instructions, check dependency with previous instructions in execution queues, and separate complex instructions into micro-instructions. Decode units 202, 252 also include re-order buffers (ROB) 203, 253. Re-order buffers 203, 253 can include any number of re-order buffers, such as one for each of a carry (CA) condition and a condition register (CR) condition. Note that the condition register condition may include a bit to indicate each of the following conditions: greater than zero, less than zero, equal to zero, and overflow. Alternatively, greater, fewer, or different conditions may be indicated by the condition register. In one embodiment, re-order buffers 203, 253 includes only a subset of these re-order buffers. Also, in order to simplify the descriptions herein, operation of processor 102 will be described in reference to a carry re-order buffer (CAROB) within re-order buffer 203 of decode unit 202 in which the CAROB keeps track of the carry status bit. However, similar descriptions would apply to any other ROB within ROBs 203, 253 which keeps track of other status bits or groups of status bits (such as one or more status bits of the condition register). Note also that re-order buffers 203, 253 may also include an control logic, as needed, to write to and read from any of the re-order buffers, and to otherwise control operation of the buffers.

Decode units 202, 252 issue instructions to execution queues, and update register renaming for issued instructions. In the embodiment shown, a group of components 204 in processor 102 allocated to Thread0 includes load queues 208, 210, 212, 214, integer queue 232, and complex integer queues 234, 236. Another group of components 254 in processor 102 allocated to Thread1 includes a separate set of load queues 208-214, while integer queue 232 and complex integer queues 234, 236 can be shared by Thread0 and Thread1. Note each of the load queues, integer queues, dependent complex queues, and independent complex queues can be referred to generically as execution queues.

Note that although the architecture shows components for Thread0 and Thread1, additional program threads can be executed by processor 102. For example, although not labeled in FIG. 2, the components allocated for Thread0 may be used to execute Thread0 and a Thread2 while components allocated for Thread1 may be used to execute Thread1 and a Thread3. Further, processor 102 may use components for Thread0 and Thread1 to process a greater number of instructions per cycle while executing only one thread at a time. Components that can be duplicated to support multi-threading are shown within a dashed box 204 in FIG. 2 that includes load queues 208-214, load arbiter 216, integer arbiter 218, branch arbiter 220, register file 222, load/store unit 224, integer execution unit 226, branch execution unit 228, and data cache 230.

Processor 102 can further schedule execution of instructions using load arbiter 216, one or more integer arbiters 218, 240, branch arbiter 220, and complex arbiter 242. Load arbiter 216 and integer arbiter 218 can arbitrate execution of load/store and integer instructions in load queues 208-214. Branch arbiter 220 can arbitrate execution of branch instructions in load queues 208-214 as well as integer instructions in integer queue 232 and complex integer queues 234, 236. Integer arbiter 240 and complex arbiter 242 can each arbitrate integer instructions from complex integer queues 234, 236.

Microprocessors that require instructions to be executed in-order experience long delays when data required to execute the instruction is not found in cache memory, i.e., a cache miss occurs. Further, instructions that depend on one another may fill the execution queue and block the execution of independent instructions. Microprocessors that allow out-of-order execution include a replay queue for instructions that experience a data cache miss and constantly check for availability of source operands in order to execute instructions. In contrast, processor 102 includes multiple load queues 208-214 to hold the dependent instructions that experience a cache miss in the same queue until completion instead of replaying or re-issuing instructions while independent instructions are free to issue from other execution queues. Additionally, when an instruction issues, since the instructions in queues 208-214 can be in-order, data for source operands will be available from result forwarding or from register file 222. In many cases, it is possible to statistically determine when data for the source operands of an instruction will be available and schedule accordingly. However, in some cases, such as Level-1 data cache misses, the data may not be available as expected. In cases where instructions are dependent on two load instructions, the dependent instructions can be sent to two different queues 208-214. The dependent instruction in one of queues 208-214 will then be invalidated when the copy of the instruction reaches the head of another of queues 208-214.

Furthermore, some instructions, such as arithmetic logic unit (ALU) instructions, conditional instructions, or logic instructions, may be dependent upon (e.g. generate and/or use) one or more status bits. This one or more status bit may be, for example, a carry bit, a condition register bit (e.g. a greater than zero bit, a less than zero bit, an equal to zero bit, an overflow bit etc.), or any grouping thereof. For example, an "Addc" processor instruction may generate a carry bit, while an "Adde" processor instruction may use a previously generated carry bit as a third source operand for the addition. In these situations, ROB 203 can be used to store the results of the one or more status bits and help provide data forwarding for the one or more status bits. In one embodiment, each entry of an ROB within ROB 203 includes an execution queue tag which identifies an execution queue location of an instruction which a particular ROB entry is assigned, a status bit data field, a result valid indicator which indicates that a corresponding instruction has executed with a status bit valid result, and a forward indicator which indicates that the status bit indicator can be forwarded to an execution queue of an instruction that is waiting to receive the value of status bit.

In single thread mode, processor 102 can concurrently send two instructions to decode unit 202 and one instruction to decode unit 252 resulting in execution of three instructions per cycle. In multi-thread mode, two threads can concurrently send two instructions each to decode units 202, 252 resulting in execution of two instructions per cycle per thread. Decode units 202, 252 can also handle issuing serialize instructions such as instruction exceptions (e.g., Translation Look-aside Buffer miss, breakpoint, and illegal instruction), software interrupts (SWI), and instructions that modify processor configuration and states.

Load arbiter 216 sends instructions to load/store unit 224. Integer arbiter 218 sends instructions to integer execution unit 226. Branch arbiter 220 sends instructions to branch execution unit 228. Integer queue 232 sends instructions to integer execution unit 244. Integer arbiter 240 sends instructions to integer execution unit 246, and complex arbiter 242 sends instructions to complex integer execution unit 248. Note that integer arbiters 218 and 240 can be combined into one arbiter that receives instructions from load queues 208-214 and complex integer queues 234, 236, and send instructions to integer execution unit 226.

Load instructions from load queues 208-214 dispatch to load/store unit 224 and will remain in a respective queue until data is returned in the next clock cycle, effectively blocking all dependent instructions until valid data is returned in the next clock cycle. Load/store unit 224 can send data ready signals to load queues 208-214 when a cache hit is detected from data cache 230. The bottom entries of load queues 208-214 can send an entry or tag that includes time stamp information to load arbiter 216. The time stamp information allows load arbiter 216 to determine and send the oldest instruction to load/store unit 224. Alternatively, load/store arbiter 216 can receive and send instructions on a round robin basis, where the first instruction that reaches arbiter 216 is the first instruction sent to load/store unit 224. The round robin basis is matched by decode units 202, 252 for issuing independent load/store instructions to load queues 208-214.

Figure 3:
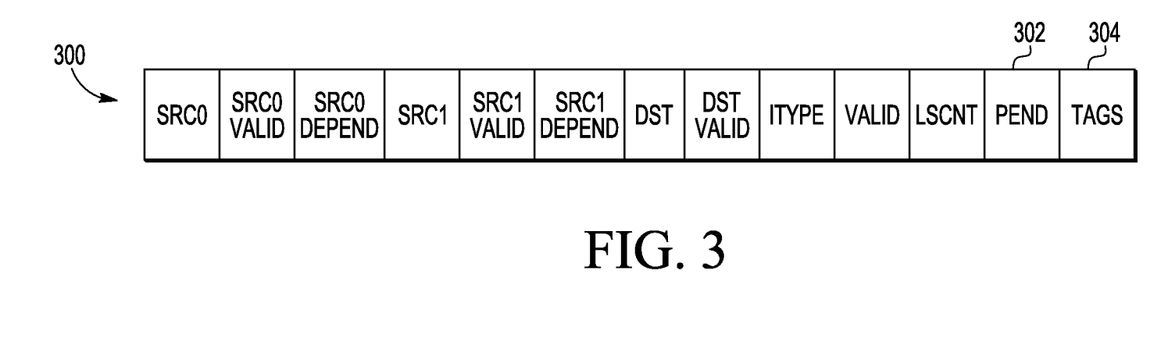
FIG. 3 is a diagram of an embodiment of an execution queue entry in the computer processor of FIG. 2 in accordance with one embodiment of the present disclosure.

FIG. 3 is a diagram of an embodiment of an execution queue entry 300 that can be used for instructions in computer processor 102 of FIG. 1 that includes several fields or tags with the following labels and corresponding significance:

| | |
|---|---|
| SRC0 | first source operand |
| SRC0_VALID | first source operand is valid |
| SRC0_DEPEND | first operand depends on immediately preceding instruction in the same queue |
| SRC1 | second source operand |
| SCR1_VALID | second source operand is valid |
| SRC1_DEPEND | second operand depends on immediately preceding instruction in the same queue |
| DST | destination operand in register file to store result of instruction execution |
| DST-VALID | destination is valid |
| ITYPE | type of instruction |
| VALID | instruction entry is valid |
| LSCNT | time stamp for instruction (can be counter value or clock value) |
| PEND | instruction has been sent to execution unit and is waiting for data that is ready to be sent in the next clock cycle |
| TAGS | Keeps track of instruction ordering during execution |

Other suitable fields and tags can be used in entries 300 in addition to or instead of the fields/tags shown hereinabove. Entries 300 can be used by decoder unit 202, load queues 208-214, common extended queue 206, and arbiters 216, 218, 220, 240, 242 to keep track of instructions. The fields/tags can be used as signals or indicators in processor 102 and methods performed therein.

FIG. 4 expands upon the TAGS field 304 and PEND fields 302 of entry 300. TAGS 304 provide tags for keeping track of instruction ordering during execution. The following tags may be stored within TAGS 304: CP_TAG; CB_TAG; SB_TAG; LB_TAG. The descriptions of each of these tags is provided in FIG. 4. Note that, for ALU instructions, the SB_TAG identifies the entry of the CA re-order buffer (CAROB) which corresponds to the ALU instruction of the execution queue entry. For store/load instructions or for predicted branch instructions, the SB_TAG field may provide different information. Similarly, for ALU instructions, the LB_TAG identifies the entry of the CR re-order buffer (CR-ROB). For store/load instructions, or for SYNC entries, the LB_TAG may provide different information. PEND 302 provides information as to whether the corresponding instruction is pending on condition execution. The following fields may be stored within PEND 302: RESULT_PENDING; CA_PENDING; CR_PENDING; SYNC_PENDING; CA_WRITE; and CR_WRITE. The CA_PENDING field indicates that the corresponding instruction has a carry-in (thus uses a carry bit as an additional source operand), and is waiting for the carry bit to be forwarded from another execution queue (as a result of execution of the appropriate instruction which generates the carry bit). The CR_PENDING field indicates that the corresponding instruction has a CR input (thus uses a condition bit from the condition register as an additional source operand), and is waiting for the CR result to be forwarded from another execution queue (as a result of execution of the appropriate instruction which generates the condition result). The CA_WRITE field indicates whether or not the corresponding instruction will write or generate a carry bit. The CR_WRITE field indicates whether the corresponding instruction will write to the condition register (CR). These values for CA_WRITE and CR_WRITE can be provided by decode unit 202 when storing an instruction into an execution queue.

With reference to FIGS. 2, 3, and 4, when a first instruction is saved to a selected queue 208-214, 232-236, a dependency indicator (SRC0_DEPEND, SRC1_DEPEND) for each corresponding operand of the first instruction can be stored in entries 300 to indicate whether or not the corresponding operand depends on a second instruction that immediately precedes the first instruction within the selected queue. When the dependency indicator for the corresponding operand indicates that it does depend on the second instruction, execution units 224-228, 244-248 can feed forward the resulting data of the second instruction for the corresponding operand for use in executing the first instruction. When the dependency indicator (SRC0_DEPEND, SRC1_DEPEND) for the corresponding operand indicates that it does not depend on the second instruction, execution units 224-228, 244-248 can obtain data from register file 222 for the corresponding operand for use in executing the first instruction.

In some embodiments, when load arbiter 216 selected selects a first instruction for execution by the load/store execution unit 224 and dependency indicator (SRC0_DEPEND, SRC1_DEPEND) for the corresponding operand indicates that it does depend on a second instruction, load/store execution unit 224 feeds forward the resulting data of the second instruction for the corresponding operand for use in executing the first instruction. When the first instruction is selected by load arbiter 216 for execution by load/store execution unit 224 and the dependency indicator for the corresponding operand indicates that it does not depend on the second instruction, load/store execution unit 224 obtains data from register file 222 for the corresponding operand for use in executing the first instruction.

In some embodiments, instructions stored in load queues 208-214 have a corresponding pending indicator (RESULT_PENDING in PEND 302) which indicates whether the instruction is available for selection by load arbiter 216 when the instruction appears in a bottom entry of the load queue.

Figure 5:
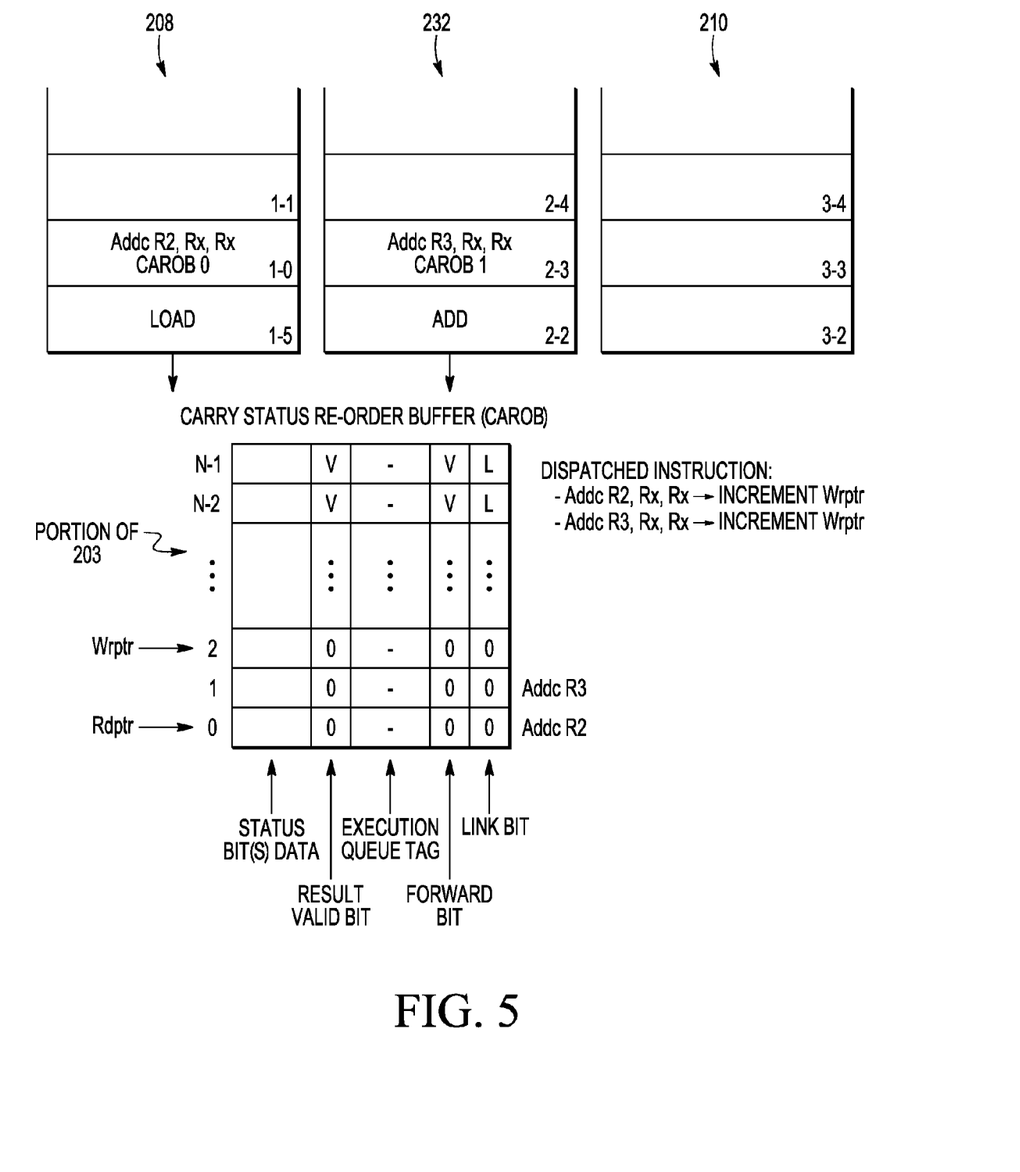
FIGS. 5-7 are diagrams of examples of instruction handling at various different points in time of the data processor of FIG. 2.
Figure 6:
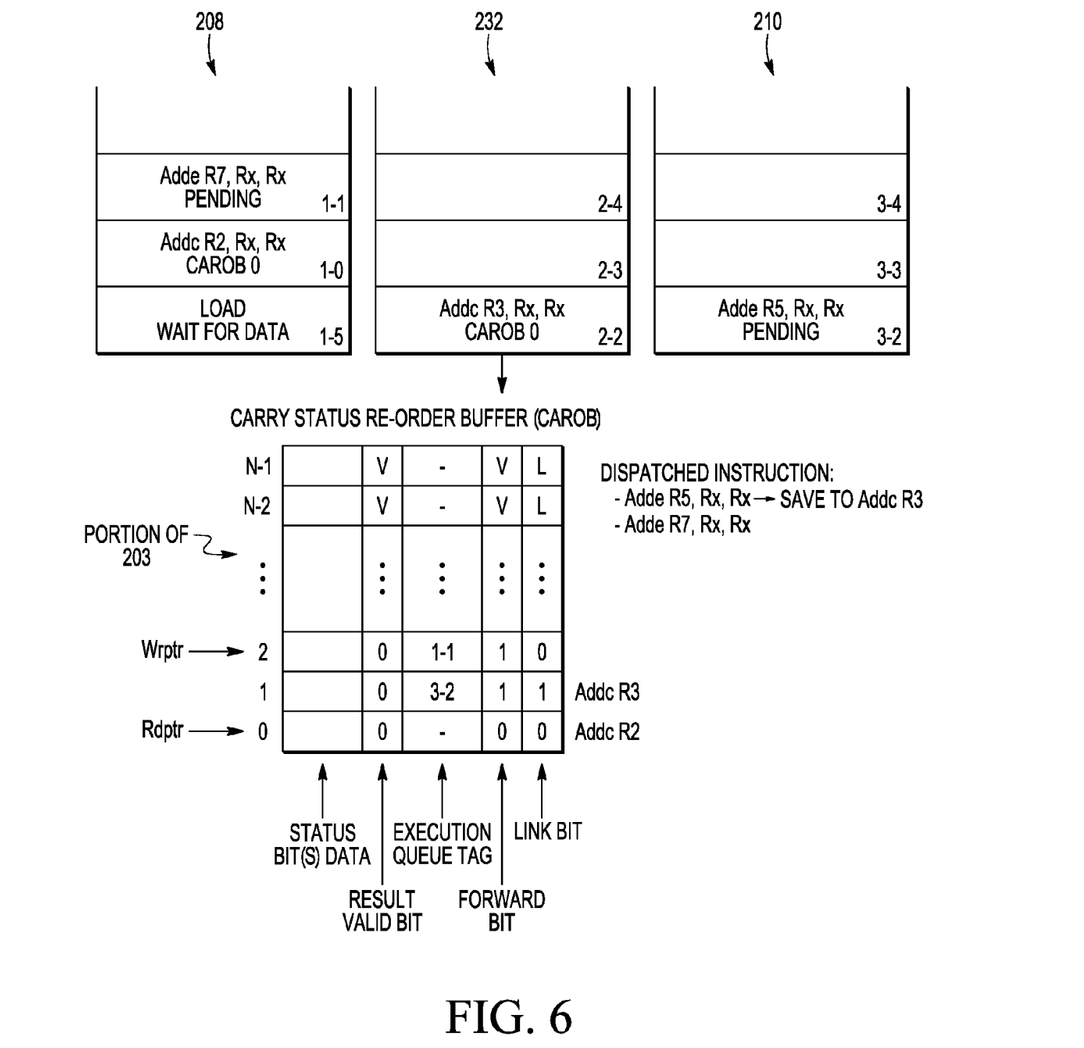
Figure 7:
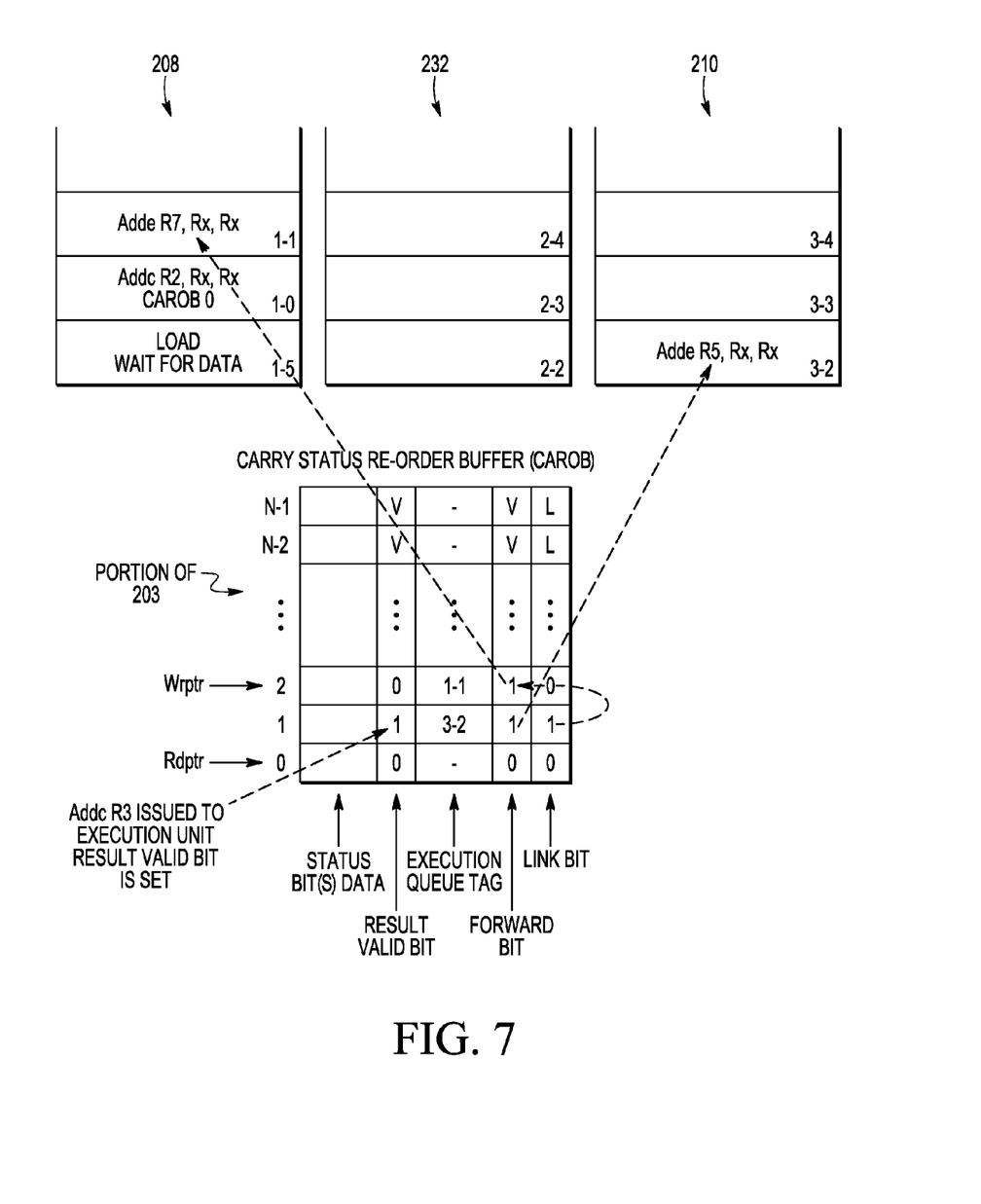

FIGS. 5-7 illustrate diagrams of an example of instruction handling at various different points in time. In the example of FIGS. 5-7, the following example instruction sequence is assumed:

Addc R2, Rx, Rx
Addc R3, Rx, Rx
Adde R5, Rx, Rx
Adde R7, Rx, Rx

In the above example, note the first register reference of the Addc or Adde instruction refers to the destination register of the add instruction (the general purpose register (GPR) to which the result of the add instruction will be stored), and the second and third register references refer to the source registers of the add instruction (the general purpose registers which store the sources of the add instruction). Note that "Rx" is a generic reference to any of the GPRs. Also, the Addc instruction generates or writes (i.e. updates) a carry bit as a result of the instruction. In one embodiment, the execution unit which executes the Addc instruction (such as the appropriate integer execution unit) will write the carry bit to a carry register which may also be located in the execution unit or elsewhere within processor 102. Therefore, the Addc instruction has two destinations: (1.) the GPR provided in the instruction in which to store the result of the addition of the contents of Rx and Rx and (2.) the carry register. The Adde instruction uses (i.e. reads) a previously generated carry bit as an additional source operand. For example, for the first Adde instruction above, the contents of Rx, Rx, and the carry bit from the carry register are added, the result of which is stored in R5. Therefore, the Adde instruction uses 3 source operands.

Referring to FIG. 5, the Addc R2, Rx, Rx instruction is dispatched by decode unit 202 to an execution queue, such as load execution queue 208. In this example, the instruction is dispatched to load queue 208 because it may include a dependency on the load instruction located in location "1-5" of queue 208. Also, the Addc R3, Rx, Rx instruction is dispatched by decode unit to integer execution queue 232 since it may include a dependency on the add instruction located in location "2-3" of queue 232. Note that the Carry Re-Order Buffer (CAROB) includes N entries, in which the entries are numbered from 0 to N-1. The write pointer, WRPTR, points to the next available (i.e. empty) entry. Therefore, the entry prior to the entry pointed to by WRPTR may be referred to as the last entry of the CAROB. Each entry in the CAROB includes a status bit data field (which may also be referred to as the carry bit data field in this example), a result valid bit (also referred to as a result valid indicator), an execution queue tag field which identifies a location in the execution queues, a forward bit (also referred to as a forward indicator), and a link bit (also referred to as a link indicator). Those instructions, such as the Addc instructions, which generate a carry bit are reflected in the CAROB. Therefore, when Addc R2, Rx, Rx is dispatched by decode unit 202 to an execution queue, an entry in the CAROB is created, such as in CAROB 0 since the decoded instruction will update a status bit (i.e. a carry bit, in this example). The wrptr is then incremented to point to CAROB 1. Also, the tag of the entry corresponding to this Addc instruction in the CAROB, CAROB 0, is written to the entry in execution queue 208, such as in the SB_TAG field. When Addc R3, Rx, Rx is decoded and dispatched to an execution queue, an entry in the CAROB is again created, such as CAROB 1. The wrptr is again incremented to point to CAROB 2. Also, the tag of the entry corresponding to this Addc instruction in the CAROB, CAROB 1, is written to the entry in execution queue 232, such as in the SB_TAG field.

Referring to FIG. 6, the Adde R5, Rx, Rx instruction is decoded and dispatched by decode unit 202 to an execution queue, such as load execution queue 210. Note that in order to be able to execute this Adde instruction, the most recent carry bit (generated by the Addc R3, Rx, Rx instruction) is needed. Therefore, the pending indicator (e.g. CA_PEND in PEND 302) of the entry for Adde R5, Rx, Rx in queue 210 at location 3-2 is set to a logic level one indicating that it is waiting for a carry bit to be generated. (Note that the Adde R5, Rx, Rx instruction cannot be selected for execution until the CA_PEND bit is cleared.) Since it is waiting for a carry bit from the Addc R3, Rx, Rx instruction, the location of the Adde R5, Rx, Rx instruction ("3-2") is stored to the tag field of CAROB 1 (which corresponds to the Addc R3, Rx, Rx instruction). This identifies, in the CAROB entry, to which instruction the carry bit generated by Addc R3, Rx, Rx should be forwarded. Therefore, the forward bit of the CAROB 1 entry is also set to a logic level 1.

Still referring to FIG. 6, the Adde R7, Rx, Rx, instruction is dispatched by decode unit 202 to an execution queue, such as load execution queue 208. Note that in order to be able to execute this Adde instruction, the most recent carry bit (again, generated by the Addc R3, Rx, Rx instruction) is needed. Therefore, the pending indicator (e.g. CA_PEND in PEND 302) of the entry for Adde R7, Rx, Rx in queue 208 at location 1-1 is set to a logic level one to indicate that it is waiting for a carry bit to be generated. Since it is also waiting for a carry bit from the Addc R3, Rx, Rx instruction, the location of the Adde instruction in CAROB 1 should also indicate the Adde instruction in location 1-1. However, in the illustrated embodiment, each CAROB entry may store one execution queue location. Therefore, in this case, the link bit of CAROB 1 (which is the entry which corresponds to the Addc R3, Rx, Rx instruction) is set to a logic level one to indicate that the next entry (CAROB 2) stores the location of another instruction (1-1) which requires the carry bit of the Addc R3, Rx, Rx instruction. The forward bit of CAROB 2, which stores the 1-1 location of the Adde R7, Rx, Rx entry, is also set to a logic level one to indicate that the carry bit needs also to be forwarded to this Adde instruction. The wrptr is again incremented to point to a next empty CAROB entry. Note that if an additional Adde instruction is present in the instruction stream after Adde R7, Rx, Rx, the link bit of CAROB 2 can be set to a logic level 1 and CAROB 3 can be used to store the execution queue location of this additional Adde instruction. Therefore, any number of entries in the CAROB may be linked in this manner.

Referring to FIG. 7, instruction Addc R3, Rx, Rx is sent for execution by integer execution unit 244. Since the SB_TAG of the Addc R3, Rx, Rx entry identifies CAROB 1, the CAROB 1 entry is used to properly forward the carry bit generated by this Addc instruction to any other instructions, as necessary. When the Addc R3, Rx, Rx instruction is executed, the result valid bit of CAROB 1 is set to a logic level 1 to indicate that the carry bit is now valid and available for use or forwarding (i.e., that the instruction has executed with a valid carry result). Also, the value of the carry bit is stored in the status bit data field of CAROB1. Alternatively, the carry bit may not be stored in the CAROB and may instead be stored elsewhere in processor 102, or may be stored in the CAROB as well as elsewhere within processor 102. In the illustrated example, CAROB 1 indicates that forwarding of the carry bit is to be performed (since the forward bit is a logic level 1), and identifies the location 3-2 as holding the instruction which needs the carry bit. Therefore, the carry bit is forwarded to location 3-2 of execution queue 210, and also the CA_PEND bit of the Adde R5, Rx, Rx instruction is cleared since it is no longer waiting for the carry bit. In this manner, the Adde R5, Rx, Rx instruction is now ready to be sent for execution. Referring back to the CAROB 1 entry, the link bit is also set, indicating that the next CAROB entry, CAROB 2, also identifies a location to which the carry bit should be forwarded. Therefore, the carry bit is also forwarded to located 1-1 in queue 208 to the Adde R7, Rx, Rx instruction. Therefore, the CA_PEND bit of the Adde R7, Rx, Rx instruction is cleared since it is not longer waiting of the carry bit. In this manner, the Adde R7, Rx, Rx instruction will be ready to be sent for execution when it reaches the bottom of execution queue 208.

Figure 8:
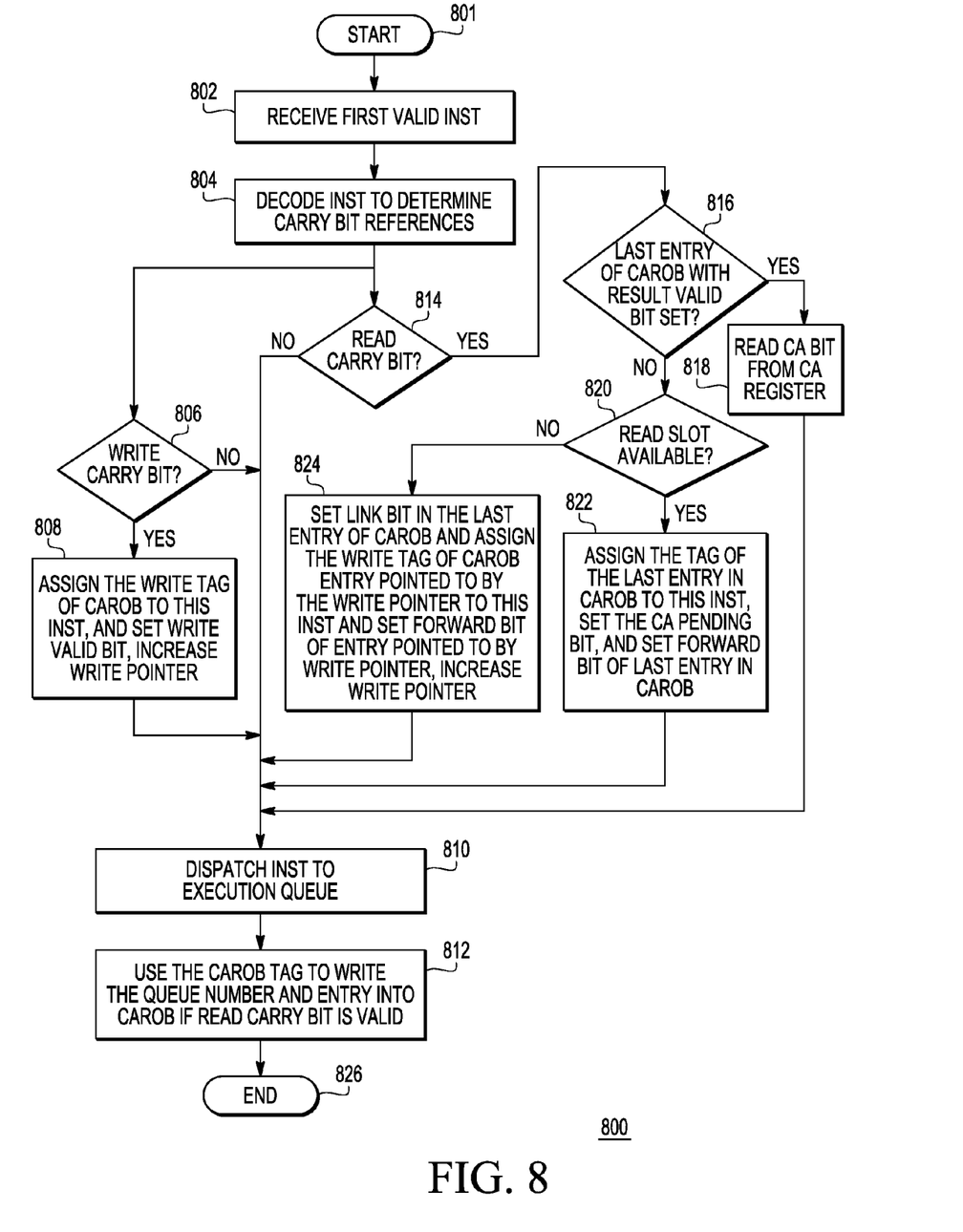
FIG. 8 is a flow diagram of an embodiment of a method for processing a first valid instruction in the data processor of FIG. 2.

FIG. 8 illustrates, in flow diagram form, a method 800 for processing a first valid instruction. Method 800 begins at start 801 and proceeds to block 802 in which a first valid instruction is received, such as by decode unit 202. Method 800 proceeds to block 804 in which the instruction is decoded, such as by decode unit 202, to determine any carry bit references. For example, as described above, an instruction may generate or write or update a carry bit (such as an Addc instruction) or an instruction may read or use a carry bit (such as an Adde instruction). Other instructions may both write and read a carry bit. From block 804, method 800 proceeds to decision diamond 806 and decision diamond 814. At decision diamond 806, it is determined whether the decoded instruction writes a carry bit. If not, method 800 proceeds to block 810 in which the instruction is dispatched to an execution queue. The method then proceeds to block 812 in which if the read carry bit is valid, the CAROB tag is used to write the execution queue number and entry (i.e. execution queue location) into the execution queue tag field of the appropriate CAROB entry. The method then ends at end 826. If, at decision diamond 806, it is determined that the instruction does write a carry bit (such as the Addc instructions in the above example of FIGS. 5-7), method 800 proceeds to block 808 in which the write tag of the CAROB (e.g. the CAROB entry identifier, such as CAROB 0 for the Addc R2, Rx, Rx instruction in the above example or CAROB1 for the Addc R3, Rx, Rx instruction in the above example) is assigned to the decoded instruction. Also, in the CAROB, an entry is created for the decoded instruction at the location currently pointed to by the wrptr. The wrptr is then increased to point to a next empty location.

Referring back to decision diamond 814, it is determined whether the decoded instruction reads a carry bit. If not, method 800 proceeds to block 810. (Note that, in this path, block 812 is not performed.) However, if the decoded instruction reads a carry bit (such as the Adde instruction described in the above example of FIGS. 5-7), then method 800 proceeds from decision diamond 814 to decision diamond 816. At decision diamond 816, it is determined whether the last entry in the CAROB (the entry before the empty entry pointed to by the wrptr) has its result valid bit set to a logic level 1. If so, then the carry bit is already valid and method 800 proceeds to block 818 in which the carry bit is read from the carry register (CA register). Alternatively, the carry bit may be read from the CAROB if it was stored in the status bit data field of the last valid write entry which has the result valid bit set. Method 800 proceeds to block 810 and then to block 812. If, at decision diamond 816, the result valid bit of the last entry in the CAROB is not set, method 800 proceeds to decision diamond 820.

At decision diamond 820, if a read slot in the last entry of the CAROB is available (meaning that an execution queue location is not already stored in the tag field of that last entry and that the forward bit in the last entry is not set), then method 800 proceeds to block 822 in which the tag of the last entry in the CAROB (e.g. the CAROB entry identifier, such as CAROB 2 for the Adde R5, Rx, Rx instruction in the above example) is assigned to the decoded instruction. Also, the forward bit in this last entry of the CAROB is set to indicate that the forwarding of the carry bit to this instruction is needed. The CA_PEND bit in the PEND field 302 of the decoded instruction, which will be stored in an execution queue, is also set to indicate that it is waiting for a carry bit. The method then proceeds to block 810. In block 812, since the instruction performs a read carry bit, the CAROB tag of this instruction in the execution queue is used to write the execution queue location (queue number and entry), such as "3-2" for the Adde R5, Rx, Rx instruction in the above example, into the CAROB entry of the instruction which will be generating the carry bit, such as CAROB 1 corresponding to the Addc R3, Rx, Rx instruction in the above example.

At decision diamond 820, if a read slot in the last entry of the CAROB is not available (meaning that the forward bit is set and thus an execution queue location is already stored in the tag field of the last valid write entry), then method 800 proceeds to block 824 in which the link bit in the last entry of the CAROB is set. Also, the write tag of the CAROB entry pointed to by the write pointer (e.g. the CAROB entry identifier, such as CAROB 3 for the Adde R7, Rx, Rx instruction in the above example) is assigned to the decoded instruction. Also, the forward bit of this CAROB entry pointed to by the write pointer is set to indicate that forwarded of the carry bit to this instruction is needed. The write pointer is then increased to point to a next empty location. The method then proceeds to block 810. In block 812, since the instruction performs a read carry bit, the CAROB tag of this instruction in the execution queue is used to write the execution queue location (queue number and entry), such as "1-1" for the Adde R7, Rx, Rx instruction in the above example, into the CAROB entry of the instruction which will be generating the carry bit, such as CAROB 1 corresponding to the Addc R3, Rx, Rx instruction in the above example.

Figure 9:
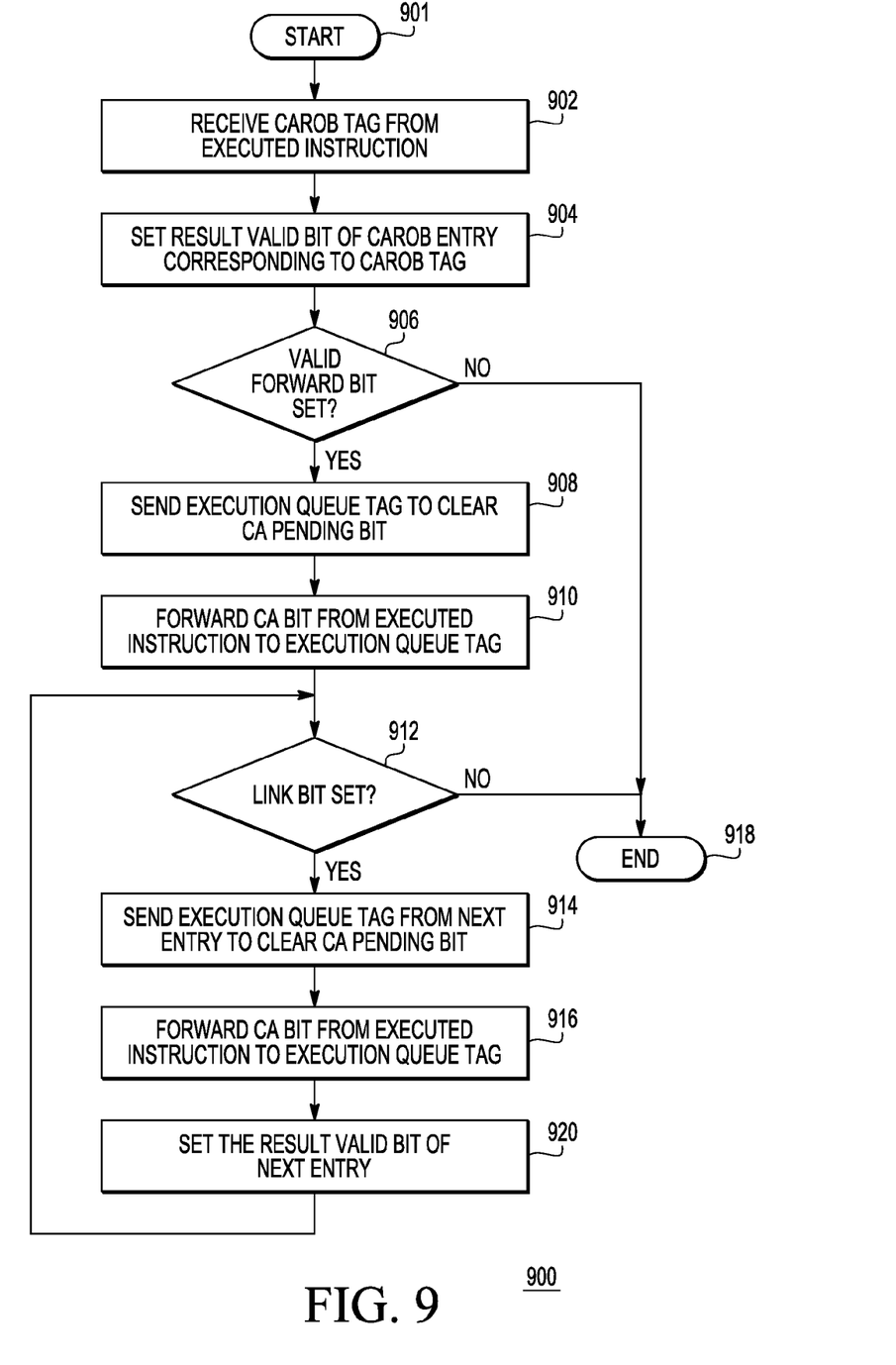
FIG. 9 is a flow diagram of an embodiment of a method for processing an executed instruction in the data processor of FIG. 2.

FIG. 9 illustrates, in flow diagram form, a method 900 for processing an executed instruction. Method 900 begins with start 901 and proceeds to block 902 in which a CAROB tag is received from an executed instruction. For example, when an instruction is sent to be executed by an execution unit from an execution queue, the CAROB tag, if any, for that instruction (which may be stored in the SB_TAG field) is provided to re-order buffers 203. Method 900 proceeds to block 904 in which result valid bit of the CAROB entry corresponding to the CAROB tag is set to a logic level one to indicate that the instruction has been executed, and thus the carry bit generated or written by that instruction is now valid. Furthermore, the value of this carry bit may be stored in the status bit storage register of the CAROB entry corresponding to the CAROB tag. Method 900 proceeds to decision diamond 906 in which it is determined whether the valid forward bit (i.e. the forward bit) of the CAROB entry corresponding to the CAROB tag is set (thus indicated forwarding is to be performed). If not, method 900 ends at end 918. If so, method 900 proceeds to block 908 in which the execution queue tag stored in the CAROB entry corresponding to the CAROB tag is sent to the execution queues in order to clear the CA_PENDING bit of the PEND field 302 of the pending instruction in the execution queue location identified by the execution queue tag. Method 900 then proceeds to block 910 in which the carry bit itself generated by the executed instruction is forwarded to the execution queue location identified by the execution queue tag for use by the pending instruction stored at that execution queue location. Method 900 proceeds to decision diamond 912.

At decision diamond 912, it is determined whether the link bit of the CAROB entry corresponding to the CAROB tag is set (thus indicating that an additional CAROB entry requires forwarding of the carry bit). If not, method 900 ends at end 918. If so, method 900 continues to block 914 in which the execution queue tag stored in the next CAROB entry (next to the entry corresponding to the CAROB tag) is sent to the execution queues in order to clear the CA_PENDING bit of the PEND field 302 of the pending instruction in the execution queue location identified by the execution queue tag. Method 900 then proceeds to block 916 in which the carry bit itself generated by the executed instruction is forwarded to the execution queue location identified by the execution queue tag for use by the pending instruction stored at that execution queue location. Method 900 then proceeds to block 920 in which the result valid bit of the next CAROB entry is also set to a logic level one since the carry bit is valid. The method returns to decision diamond 912 to check if another link bit is set. In this case, the link bit of the entry next to the CAROB entry corresponding to the CAROB tag is checked to see if it is set. Note that each subsequent time after block 916, the link bit of a subsequent CAROB entry is checked, since there could be any number of linked entries which need forwarding of the carry bit generated by the executed instruction. Note that the carry bit may be sent from the execution unit to the CAROB and execution queue in a later cycle.

Note that methods 800 and 900 have been described in reference to the carry bit as a particular example of a status bit. However, similar descriptions would apply to other status bits. For example, in block 804, an instruction can be decoded to determine any references or dependencies on a status bit or group of status bits. In decision diamonds 806 and 814, determinations can be made as to whether the one or more status bits are written to or updated by the instruction and/or used or read by the instruction. Similarly, in blocks 908 and 914, the corresponding status pending bit may be cleared when the particular one or more status bits are forwarded.

Therefore, by now it can be understood how re-order buffers, such as the CAROB, can be used to forward information to instructions within the execution queues. In this manner, additional locations in the execution queues need not be taken up to reflect the dependencies of instructions on such items such as the carry bit, a condition of the condition register, or an overflow condition. By maintaining these dependencies with the use of the re-order buffers, increased instruction execution efficiency may be achieved.

Note that the functionality of all or a portion of methods 800 and 900 may be executed by logic instructions executable by processor 102.

The terms "assert" or "set" and "negate" (or "deassert" or "clear") have been used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Some of the above embodiments, as applicable, may be implemented using a variety of different information processing systems. For example, although FIG. 1 and FIG. 2 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a data processing system including a processor unit that includes an instruction decode/issue unit including a re-order buffer having entries. The entries include an execution queue tag that indicates an execution queue location of an instruction to which a re-order buffer entry is assigned; a result valid indicator to indicate that a corresponding instruction has executed with a status bit valid result; and a forward indicator to indicate that a status bit can be forwarded to an execution queue of an instruction that is waiting to receive the status bit. Item 2 includes the system of item 1, wherein the re-order buffer entries further includes the status bit; and a link indicator to indicate a second instruction will use the status bit. Item 3 includes the system of item 1 and further includes logic instructions configured to: receive an instruction; decode the instruction to determine if the instruction will update the status bit, if the instruction will update the status bit, assign one of the entries in the re-order buffer to the instruction, increment a write pointer for the re-order buffer entries; and dispatch the instruction to an execution queue. Item 4 includes the system of item 2 and further includes logic instructions configured to: receive an instruction; decode the instruction to determine if the instruction will use the status bit, if the instruction will use the status bit, if the result valid indicator is set for a last entry in the re-order buffer, read the status bit from the last entry. Item 5 includes the system of item 4 and further includes logic instructions configured to: when the instruction uses the status bit, when the result valid indicator is not set in the last entry in the re-order buffer, when the forward indicator is not set in the last entry in the re-order buffer, assign the last entry in the re-order buffer to the instruction, set a status pending indicator for the instruction in the execution queue, and set the forward indicator of the last entry in the re-order buffer; when the forward indicator is set in the last entry in the re-order buffer, set the link indicator in the last entry in the re-order buffer, assign the entry pointed to by a write pointer of the re-order buffer to the instruction, set the forward indicator of the entry pointed to by the write pointer, and increment the write pointer; dispatch the instruction to an execution queue; and write the execution queue location of the instruction in the execution queue tag of the re-order buffer entry assigned to the instruction. Item 6 includes the system of item 2 and further includes logic instructions configured to receive a re-order buffer tag from an executed instruction; set the result valid indicator of the re-order buffer entry corresponding to the re-order buffer tag; if the forward indicator is set in the re-order buffer entry corresponding to the re-order buffer tag, send the execution queue tag to clear a status pending indicator in the corresponding execution queue location for a pending instruction, and forward the status bit from the executed instruction to the pending instruction with the corresponding execution queue tag, when the link indicator is set, send the execution queue tag from a next entry in the re-order buffer to clear the status pending indicator in a corresponding execution queue location for the second pending instruction, forward the status bit from the executed instruction to a second pending instruction with a corresponding second execution queue tag, write the status bit into the next entry in the re-order buffer, and set the result valid indicator of the next entry in the re-order buffer. Item 7 includes the system of item 6 and further includes logic instructions configured to: send the status bit from the executed instruction to the re-order buffer and to pending instructions in the execution queue in a later processing cycle.

Item 8 includes a method including: receiving an instruction; decoding the instruction to determine if the instruction will update a status bit in a computer processing system; when the instruction will update the status bit, assigning an entry in a re-order buffer in the processing system to the instruction, and incrementing a write pointer for entries in the re-order buffer; and dispatching the instruction to an execution queue in the processing system. Item 9 includes the method of item 8 and further includes decoding the instruction to determine if the instruction will use the status bit; when the instruction will use the status bit, when a result valid indicator is set for a last entry in the re-order buffer, reading the status bit from the last entry. Item 10 includes the method of item 8 and further includes when the instruction will use the status bit, when a result valid indicator is not set for a last entry in the re-order buffer, when a forward indicator is not set in the last entry, assigning the last entry to the instruction, setting a status pending indicator for the instruction in the execution queue, and setting the forward indicator of the last entry in the re-order buffer; when the forward indicator is set in the last entry in the re-order buffer, setting a link indicator in the last entry, assigning one of the entries pointed to by the write pointer to the instruction, setting the forward indicator of the entry pointed to by the write pointer, and incrementing the write pointer; dispatching the instruction to the execution queue; and writing an execution queue location of the instruction in an execution queue tag of the entry assigned to the instruction. Item 11 includes the method of item 8 and further includes receiving a re-order buffer tag from an executed instruction; setting a result valid indicator of one of the entries corresponding to the re-order buffer tag; writing the status bit into in the re-order buffer entry corresponding to the re-order buffer tag; when a forward indicator is set in the one of the entries, sending an execution queue tag to clear a status pending indicator in a corresponding execution queue location for a pending instruction, and forwarding the status bit from the executed instruction to the pending instruction with the corresponding execution queue tag; when a link indicator is set in the one of the entries, sending the execution queue tag from a next entry in the re-order buffer to clear a status pending indicator in a corresponding execution queue location for a second pending instruction, forwarding the status bit from the executed instruction to the second pending instruction, writing the status bit into the next entry in the re-order buffer, and setting the result valid indicator of the next entry in the re-order buffer. Item 12 includes the method of item 11 and further includes sending the status bit from the executed instruction to the re-order buffer and the pending instructions in the execution queue in a later cycle.

Item 13 includes a data processing system including a processing unit including a re-order buffer; a plurality of re-order buffer entries in the re-order buffer, wherein the re-order buffer entries include information to coordinate out-of-order execution of instructions; logic instructions configured to: receive a re-order buffer tag from an executed instruction; set a result valid indicator of a re-order buffer entry corresponding to the re-order buffer tag; update a status bit in the re-order buffer entry corresponding to the re-order buffer tag for the executed instruction; if a forward indicator is set in the re-order buffer entry, send an execution queue tag to clear a status pending indicator in a corresponding execution queue location for a pending instruction, and forward the status bit from the executed instruction to the pending instruction with the corresponding execution queue tag; when a link indicator is set is set in the re-order buffer entry, send the execution queue tag from a next entry in the re-order buffer to clear a pending indicator in the corresponding execution queue location for a second pending instruction, and forward the status bit from the executed instruction to the execution queue tag for the second pending instruction. Item 14 includes the system of item 13 and further includes logic instructions configured to send the status bit from the executed instruction to the re-order buffer and pending instructions in an execution queue in a later processing cycle. Item 15 includes the system of item 13 and further includes an instruction decode/issue unit in the processing unit that includes the re-order buffer; wherein the execution queue tag indicates an execution queue number of an instruction to which a particular re-order buffer entry is assigned. Item 16 includes the system of item 13 and further includes logic instructions configured to: when the link indicator is set, write the status bit into the next entry in the re-order buffer, and set the result valid indicator in the next entry in the re-order buffer. Item 17 includes the system of item 13 and further includes an instruction decode/issue unit in the processing unit that includes the re-order buffer; wherein the result valid indicator indicates that a corresponding instruction has executed with a status bit valid result. Item 18 includes the system of item 13 and further includes an instruction decode/issue unit in the processing unit that includes the re-order buffer; wherein the forward indicator indicates that the status bit can be forwarded to an execution queue of an instruction that is waiting to receive the status bit. Item 19 includes the system of item 13 and further includes an instruction decode/issue unit in the processing unit that includes the re-order buffer; wherein the link indicator indicates another instruction will use the status bit. Item 20 includes the system of item 13 and further includes logic instructions configured to: receive an instruction; decode the instruction to determine if the instruction will update the status bit for the instruction, assign one of the entries in the re-order buffer to the instruction, increment a write pointer for the re-order buffer entries; when the instruction uses the status bit for the instruction, when the forward indicator is not set in the last entry in the re-order buffer, assign the last entry in the re-order buffer to the instruction, set the status pending indicator for the instruction in the execution queue, and set the forward indicator of the last entry in the re-order buffer; when the forward indicator is set in the last entry in the re-order buffer, set the link indicator in the last entry in the re-order buffer, assign a write tag of the entry pointed to by the write pointer of the re-order buffer to the instruction, set the forward indicator of the entry pointed to by the write pointer, and increment the write pointer; dispatch the instruction to the execution queue; and write the execution queue location of the instruction in the execution queue tag in the re-order buffer entry assigned to the instruction.

What is claimed is:

1. A data processing system comprising:
    an instruction decode/issue unit including a re-order buffer having entries;
    a plurality of execution queues configured to store instructions received from the instruction decode/issue unit and waiting to be executed; and
    a plurality of execution units coupled to the plurality of execution queues, wherein each execution unit is configured to receive instructions from the plurality of execution queues, wherein each entry in the re-order buffer is configured to store:
        an execution queue tag that indicates an execution queue location of an instruction to which a re-order buffer entry is assigned;
        a result valid indicator to indicate that a corresponding instruction has executed with a status bit valid result;
        a forward indicator to indicate that a status bit can be forwarded to an execution queue of an instruction that is waiting to receive the status bit;
        the status bit;
        a link indicator to indicate a second instruction will use the status bit,
    wherein the re-order buffer is configured to:
        receive a re-order buffer tag from an executed instruction;
        set the result valid indicator of the re-order buffer entry corresponding to the re-order buffer tag;
        if the forward indicator is set in the re-order buffer entry corresponding to the re-order buffer tag,
            send the execution queue tag to the plurality of execution queues to clear a status pending indicator in the corresponding execution queue location for a pending instruction, and
            forward the status bit from the executed instruction to the pending instruction with the corresponding execution queue tag,
        when the link indicator is set,
            send the execution queue tag to the plurality of execution queues from a next entry in the re-order buffer to clear the status pending indicator in a corresponding execution queue location for the second pending instruction,
            forward the status bit from the executed instruction to a second pending instruction with a corresponding second execution queue tag,
            write the status bit into the next entry in the re-order buffer, and
            set the result valid indicator of the next entry in the re-order buffer.

2. The system of claim 1 wherein:
    the instruction decode/issue unit is configured to receive an instruction,
    decode the instruction to determine if the instruction will update the status bit, and
    dispatch the instruction to an execution queue, and
    the re-order buffer is configured to, if the instruction will update the status bit, assign one of the entries in the re-order buffer to the instruction and increment a write pointer for the re-order buffer entries.

3. The system of claim 1 wherein:
    the instruction decode/issue unit is configured receive an instruction, and
    decode the instruction to determine if the instruction will use the status bit, and
    the re-order buffer is configured to, if the instruction will use the status bit and if the result valid indicator is set for a last entry in the re-order buffer, read the status bit from the last entry.

4. The system of claim 3
    wherein, when the instruction uses the status bit,
        when the result valid indicator is not set in the last entry in the re-order buffer,
            when the forward indicator is not set in the last entry in the re-order buffer,
                the re-order buffer is configured to assign the last entry in the re-order buffer to the instruction and set the forward indicator of the last entry in the re-order buffer, and the plurality of execution queues are configured to set a status pending indicator for the instruction in the execution queue;
when the forward indicator is set in the last entry in the re-order buffer, the re-order buffer is configured to:
set the link indicator in the last entry in the re-order buffer,
assign the entry pointed to by a write pointer of the re-order buffer to the instruction,
set the forward indicator of the entry pointed to by the write pointer, and
increment the write pointer;
wherein the instruction decode/issue unit is configured to dispatch the instruction to an execution queue; and
wherein the re-order buffer is configured to write the execution queue location of the instruction in the execution queue tag of the re-order buffer entry assigned to the instruction.

5. The system of claim 1 wherein
an execution unit of the plurality of execution units which executed the executed instruction is configured to send the status bit from the executed instruction to the re-order buffer and to pending instructions in the execution queue in a later processing cycle.

6. A method comprising:
receiving an instruction;
decoding the instruction to determine if the instruction will update a status bit in a computer processing system;
when the instruction will update the status bit,
assigning an entry in a re-order buffer in the processing system to the instruction, and
incrementing a write pointer for entries in the re-order buffer;
dispatching the instruction to an execution queue in the processing system
receiving a re-order buffer tag from an executed instruction;
setting a result valid indicator of one of the entries corresponding to the re-order buffer tag;
writing the status bit into in the re-order buffer entry corresponding to the re-order buffer tag;
when a forward indicator is set in the one of the entries,
sending an execution queue tag to clear a status pending indicator in a corresponding execution queue location for a pending instruction, and
forwarding the status bit from the executed instruction to the pending instruction with the corresponding execution queue tag;
when a link indicator is set in the one of the entries,
sending the execution queue tag from a next entry in the re-order buffer to clear a status pending indicator in a corresponding execution queue location for a second pending instruction,
forwarding the status bit from the executed instruction to the second pending instruction,
writing the status bit into the next entry in the re-order buffer, and setting the result valid indicator of the next entry in the re-order buffer.

7. The method of claim 6 further comprising:
decoding the instruction to determine if the instruction will use the status bit;
when the instruction will use the status bit,
when a result valid indicator is set for a last entry in the re-order buffer, reading the status bit from the last entry.

8. The method of claim 6 further comprising:
when the instruction will use the status bit,
when a result valid indicator is not set for a last entry in the re-order buffer,
when a forward indicator is not set in the last entry,
assigning the last entry to the instruction, setting a status pending indicator for the instruction in the execution queue, and setting the forward indicator of the last entry in the re-order buffer;
when the forward indicator is set in the last entry in the re-order buffer,
setting a link indicator in the last entry,
assigning one of the entries pointed to by the write pointer to the instruction,
setting the forward indicator of the entry pointed to by the write pointer, and
incrementing the write pointer;
dispatching the instruction to the execution queue; and
writing an execution queue location of the instruction in an execution queue tag of the entry assigned to the instruction.

9. The method of claim 6 further comprising:
sending the status bit from the executed instruction to the re-order buffer and the
pending instructions in the execution queue in a later cycle.
an instruction decode/issue unit including a re-order buffer having entries that include
an execution queue tag that indicates an execution queue location of an instruction to which a re-order buffer entry is assigned;
a result valid indicator to indicate that a corresponding instruction has executed with a status bit valid result; and
a forward indicator to indicate that a status bit can be forwarded to an execution queue of an instruction that is waiting to receive the status bit.

10. A data processing system comprising:
an instruction decode/issue unit including a re-order buffer having a plurality of re-order buffer entries, wherein the re-order buffer entries are configured to store information to coordinate out-of-order execution of instructions;
a plurality of execution queues configured to store instructions received from the instruction decode/issue unit and waiting to be executed; and
a plurality of execution units coupled to the plurality of execution queues, wherein each execution unit is configured to receive instructions from the plurality of execution queues,
wherein the re-order buffer is configured to:
receive a re-order buffer tag from an executed instruction;
set a result valid indicator of a re-order buffer entry corresponding to the re-order buffer tag;
update a status bit in the re-order buffer entry corresponding to the re-order buffer tag for the executed instruction;
if a forward indicator is set in the re-order buffer entry, send an execution queue tag to the plurality of execution queues to clear a status pending indicator in a corresponding execution queue location for a pending instruction, and
forward the status bit from the executed instruction to the pending instruction with the corresponding execution queue tag;

when a link indicator is set is set in the re-order buffer entry,
send the execution queue tag from a next entry in the re-order buffer to the plurality of execution queues to clear a pending indicator in the corresponding execution queue location for a second pending instruction, and
forward the status bit from the executed instruction to the execution queue tag for the second pending instruction.

11. The system of claim 10 wherein
an execution unit of the plurality of execution units which executed the executed instruction is configured to send the status bit from the executed instruction to the re-order buffer and pending instructions in an execution queue in a later processing cycle.

12. The system of claim 10 wherein the execution queue tag indicates an execution queue number of an instruction to which a particular re-order buffer entry is assigned.

13. The system of claim 10 wherein the re-order buffer is configured to:
when the link indicator is set,
write the status bit into the next entry in the re-order buffer, and
set the result valid indicator in the next entry in the re-order buffer.

14. The system of claim 10 wherein the result valid indicator indicates that a corresponding instruction has executed with a status bit valid result.

15. The system of claim 10 wherein the forward indicator indicates that the status bit can be forwarded to an execution queue of an instruction that is waiting to receive the status bit.

16. The system of claim 10 wherein the link indicator indicates another instruction will use the status bit.

17. The system of claim 10 wherein the instruction decode/issue unit is configured to receive an instruction,
decode the instruction to determine if the instruction will update the status bit for the instruction,
dispatch the instruction to the execution queue, and
wherein the re-order buffer is configured to:
assign one of the entries in the re-order buffer to the instruction,
increment a write pointer for the re-order buffer entries,
when the instruction uses the status bit for the instruction,
when the forward indicator is not set in the last entry in the re-order buffer,
assign the last entry in the re-order buffer to the instruction, set the status pending indicator for the instruction in the execution queue, and set the forward indicator of the last entry in the re-order buffer,
when the forward indicator is set in the last entry in the re-order buffer,
set the link indicator in the last entry in the re-order buffer,
assign a write tag of the entry pointed to by the write pointer of the re-order buffer to the instruction,
set the forward indicator of the entry pointed to by the write pointer, and
increment the write pointer; and
wherein the re-order buffer is further configured to write the execution queue location of the instruction in the execution queue tag in the re-order buffer entry assigned to the instruction.

* * * * *